US011477653B2

(12) United States Patent
Buron et al.

(10) Patent No.: US 11,477,653 B2
(45) Date of Patent: Oct. 18, 2022

(54) SYSTEM AND METHOD TO IMPROVE ENCRYPTED TRANSMISSIONS BETWEEN NODES

(71) Applicant: Silicon Laboratories Inc., Austin, TX (US)

(72) Inventors: Jakob Buron, Søborg (DK); Anders Lynge Esbensen, København (DK); Jonas Roum-Møller, Hørsholm (DK)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/212,488

(22) Filed: Mar. 25, 2021

(65) Prior Publication Data

US 2022/0217541 A1 Jul. 7, 2022

Related U.S. Application Data

(60) Provisional application No. 63/133,876, filed on Jan. 5, 2021.

(51) Int. Cl.

| | |
|---|---|
| ***H04W 12/03*** | (2021.01) |
| ***H04W 12/122*** | (2021.01) |
| ***H04W 12/106*** | (2021.01) |
| ***H04W 12/61*** | (2021.01) |
| ***H04W 56/00*** | (2009.01) |

(52) U.S. Cl.

CPC ......... *H04W 12/122* (2021.01); *H04W 12/03* (2021.01); *H04W 12/106* (2021.01); *H04W 12/61* (2021.01); *H04W 56/001* (2013.01)

(58) Field of Classification Search

CPC .............................. H04W 12/10; H04W 12/12

See application file for complete search history.

(56) References Cited

U.S. PATENT DOCUMENTS

| | | | | |
|---|---|---|---|---|
| 10,833,885 B2 * | 11/2020 | Esbensen | .............. | H04L 12/189 |
| 2008/0095361 A1 * | 4/2008 | Wifvesson | ............ | H04L 9/0841 380/28 |
| 2021/0050999 A1 * | 2/2021 | Huang | .................. | H04L 9/3242 |

* cited by examiner

*Primary Examiner* — Michael T Vu

(74) *Attorney, Agent, or Firm* — Nields, Lemack & Frame, LLC

(57) ABSTRACT

Systems and methods for improving encrypted transmissions between nodes in a network are disclosed. In one embodiment, two sets of nonce values are used to monitor communications between each pair of network devices, wherein one set of nonce values is used for packets transmitted from a first node to a second node, and the second set of nonce values is used for packets transmitted from the second node to the first node. These nonce values are used to encrypt packets transmitted between the two nodes. In this way, the probability of loss of synchronization may be reduced, especially in configurations where there is an intermediate node between the first node and the second node. In another embodiment, the possibility of a delay attack is minimized by the intentional resetting of security parameters.

15 Claims, 4 Drawing Sheets

SYSTEM AND METHOD TO IMPROVE ENCRYPTED TRANSMISSIONS BETWEEN NODES

This application claims priority of U.S. Provisional Patent Application Ser. No. 63/133,876, filed Jan. 5, 2021, the disclosure of which is incorporated by reference in its entirety.

This disclosure describes systems and methods for maintaining synchronization between two nodes to allow the encryption of transmissions between those nodes, and minimize the chance of a delay attack.

BACKGROUND

Certain network protocols utilize encryption to securely transmit messages between nodes. In certain embodiments, all of the messages are encrypted using the same key. In other words, the two nodes determine an encryption key and utilize that key for all transmissions.

In other embodiments, the two nodes may utilize initialization vectors (IVs) or nonces so that each transmission is encrypted using a different key. For example, the Z-Wave network protocol uses a concept of SPANs (Singlecast Pre-Agreed Nonce). For each transmission between two nodes, a unique SPAN is used, which is known only to the two nodes. After the transmission is sent and received, both nodes update the SPAN using the same algorithm.

In this way, a malicious actor cannot decipher transmissions between the two nodes by monitoring these transmissions over an extended period, since each transmission was sent with a different SPAN. This technique requires that the two nodes remain synchronized such that each is aware of the SPAN that was used by the other node to encrypt the incoming packet.

However, there are issues with this approach. FIG. 1 shows one such limitation. In this situation, a first node 1, labelled Node A, and a second node 2, labelled Node B, are communicating with each other through an intermediate node 3, which may be a repeater or other device. The first node 1 and second node 2 utilize the same SPAN for all communications between the two nodes. Specifically, when a node transmits or receives a packet, it updates its SPAN. For example, the node may increment a counter, which is used as an index into a sequence of nonce values. Alternatively, the node may execute a software function to update its SPAN. At time T0, the two nodes are synchronized, and both indicate that the SPAN is set to the same number, which for purposes of illustration, is 18. Of course, any other value may also be used. This SPAN is used to encrypt and decrypt a particular packet.

At time T1, Node A transmits a first packet to the intermediate node 3 and receives an acknowledgement from that intermediate node 3. Consequently, since the packet was successfully transmitted, Node A increments the SPAN. Thus, Node A now believes that the current SPAN is 19.

At time T2, the intermediate node 3 then forwards the first packet to Node B. However, this transmission may fail, such that Node B does not receive the first packet, which must be retransmitted by the intermediate node 3 at a later time. The retransmission utilizes the same SPAN value.

However, Node B may have a second packet to transmit to Node A. Since Node B has yet to receive the first packet, it uses the SPAN value of 18 to transmit this second packet to Node A at time T3. Since the second packet was successfully transmitted, Node B updates its SPAN to 19.

However, Node A is unable to decrypt this second packet because its SPAN has already been updated to 19, as described above.

At time T4, the intermediate node 3 successfully forwards the first packet to Node B. However, Node B cannot decrypt this packet since this packet utilizes a SPAN value of 18 and the SPAN for Node B current is set to 19.

Because the two nodes 1, 2 were unable to decrypt these two packets, the two nodes 1, 2 are forced to resynchronize as shown at time T5. Note that the resynchronization process is time consuming, increases power and lowers efficiency.

Therefore, it would be beneficial if there were a system and method to maintain synchronization between two nodes that utilize IVs or nonces. It would be advantageous if this technique could be easily introduced.

SUMMARY

Systems and methods for improving encrypted transmissions between nodes in a network are disclosed. In one embodiment, two sets of nonce values are used to encrypt communications between each pair of network devices, wherein one set of nonce values is used for packets transmitted from a first node to a second node, and the second set of nonce values is used for packets transmitted from the second node to the first node. These nonce values are used to encrypt packets transmitted between the two nodes. In this way, the probability of loss of synchronization may be reduced, especially in configurations where there is an intermediate node between the first node and the second node. In another embodiment, the possibility of a delay attack is minimized by the intentional resetting of security parameters.

According to one embodiment, a method of maintaining synchronization between a first node and a second node transmitting encrypted packets is disclosed. The method comprises creating, in the first node and the second node, an initial value for a first nonce value used for transmissions from the first node to the second node; updating, at the first node, the first nonce value whenever a packet destined for the second node is successfully transmitted; and updating, at the second node, the first nonce value whenever a packet from the first node is successfully received; wherein the first nonce value is used by the first node to encrypt packets transmitted to the second node and by the second node to decrypt packets received from the first node. In some embodiments, the method further comprises creating, in the first node and the second node, an initial value for a second nonce value used for transmissions from the second node to the first node; updating, at the second node, the second nonce value whenever a packet destined for the first node is successfully transmitted; and updating, at the first node, the second nonce value whenever a packet from the second node is successfully received; wherein the second nonce value is used by the second node to encrypt packets transmitted to the first node and by the first node to decrypt packets received from the second node. In certain embodiments, the first nonce value and the second nonce value differ over time due to a difference in events that cause each nonce value to be updated. In some embodiments, the first node and the second node each comprise a sequence of first nonce values, and updating the first nonce value comprises incrementing an index into the sequence of first nonce values. In some embodiments, the first node and the second node each comprise a sequence of nonce values, and updating the first nonce value comprises incrementing a first index into the sequence of nonce values and updating the second nonce value comprises incrementing a second index into the sequence of nonce values. In some embodiments, the first node and the second node each comprise a sequence of first nonce values and a sequence of second nonce values, and updating the first nonce value comprises incrementing a first index into the sequence of first nonce values and updating the second nonce value comprises incrementing a second index into the sequence of second nonce values. In certain embodiments, updating the first nonce value comprises invoking a software function, wherein a new first nonce value is generated each time the software function is invoked. In some embodiments, updating the first nonce value comprises incrementing a previous first nonce value.

According to a second embodiment, a network device is disclosed. The network device comprises a wireless network interface to communicate with a second network device; a processing unit; and a memory device, comprising instructions, which when executed by the processing unit, enable the network device to: create an initial value for a first nonce value used for transmissions from the network device to a second network device; and update the first nonce value whenever a packet destined for the second network device is successfully transmitted; wherein the first nonce value is used to encrypt a packet transmitted to the second network device. In some embodiments, the network device further comprises instructions, which when executed by the processing unit, enable the network device to: create an initial value for a second nonce value used for transmissions from the second network device to the network device; and update the second nonce value whenever a packet from the second network device is successfully received; wherein the second nonce value is used to decrypt a packet transmitted from second network device. In certain embodiments, the first nonce value and the second nonce value differ over time due to a difference in events that cause each nonce value to be updated. In some embodiments, the network device comprises a sequence of first nonce values, and updating the first nonce value comprises incrementing an index into the sequence of first nonce values. In some embodiments, the network device comprises a sequence of nonce values, and updating the first nonce value comprises incrementing a first index into the sequence of nonce values and updating the second nonce value comprises incrementing a second index into the sequence of nonce values. In certain embodiments, the network device comprises a sequence of first nonce values and a sequence of second nonce values, and updating the first nonce value comprises incrementing a first index into the sequence of first nonce values and updating the second nonce value comprises incrementing a second index into the sequence of second nonce values. In certain embodiments, updating the first nonce value comprises invoking a software function, wherein a new first nonce value is generated each time the software function is invoked.

According to another embodiment, a method of minimizing a risk of a delay attack between a first node and a second node transmitting encrypted packets is disclosed. The method comprises initiating a resynchronization process based on a predetermined parameter, wherein the resynchronization process resets security parameters associated with the first node and the second node. In certain embodiments, the predetermined parameter comprises a time duration since a packet was received. In some embodiments, the predetermined parameter comprises a regular time interval. In some embodiments, the predetermined parameter comprises noise or RSSI levels. In some embodiments, the security parameters comprise the nonce value or nonce values used to encrypt packets between the first node and the second node.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 2:
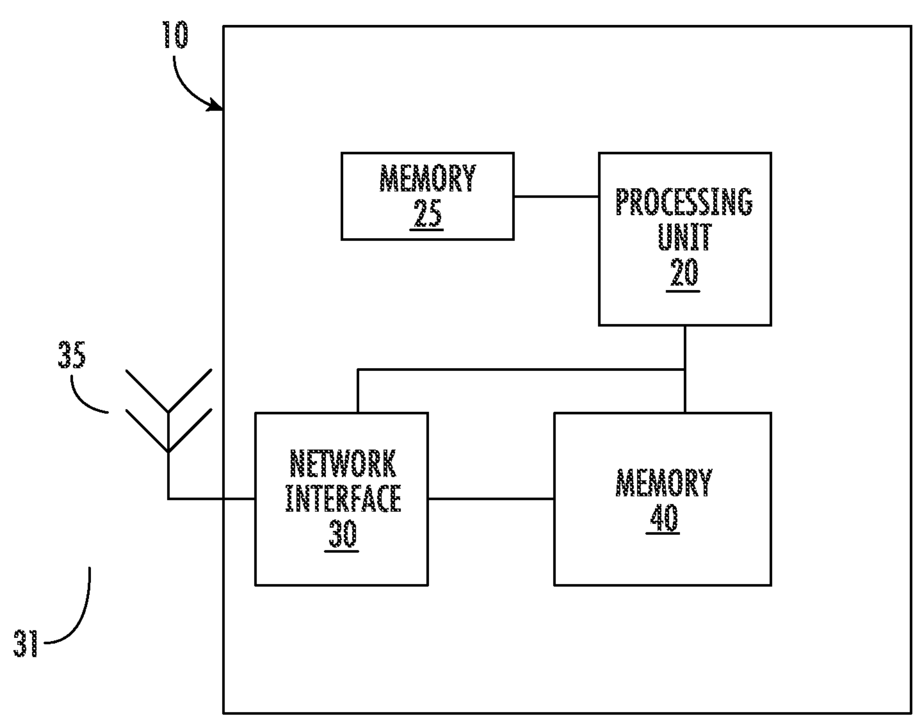
FIG. 2 shows a block diagram of a network device according to one embodiment.

FIG. 2 shows a block diagram of a network device 10 that may be used to implement the techniques described herein. The network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The network device 10 also includes a network interface 30, which may be a wireless network interface that includes an antenna 35. The network interface 30 may support any wireless network that supports security classes, such as WiFi, networks utilizing the IEEE 802.15.4 specification, such as Zigbee, networks utilizing the IEEE 802.15.6 specification, and wireless smart home protocols, such as Z-Wave. The network interface 30 is used to allow the network device 10 to communicate with other devices disposed on the first network 31.

The network device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 2. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30 and the second memory device 40 are shown in FIG. 2 as separate components, it is understood that some or all of these components may be integrated into a single electronic component. Rather, FIG. 2 is used to illustrate the functionality of the network device 10, not its physical configuration.

Although not shown, the network device 10 also has a power supply, which may be a battery or a connection to a permanent power source, such as a wall outlet.

In contrast to previous embodiments, the present network device 10 maintains a separate SPAN value for packets being transmitted to a second node, and packets being received by that second node. Thus, within the memory device 25 or within the second memory device 40, the network device 10 maintain two SPAN values per connection; a transmit SPAN value for packets being transmitted to a second node and a receive SPAN value for packets being received by the second node.

Figure 3:
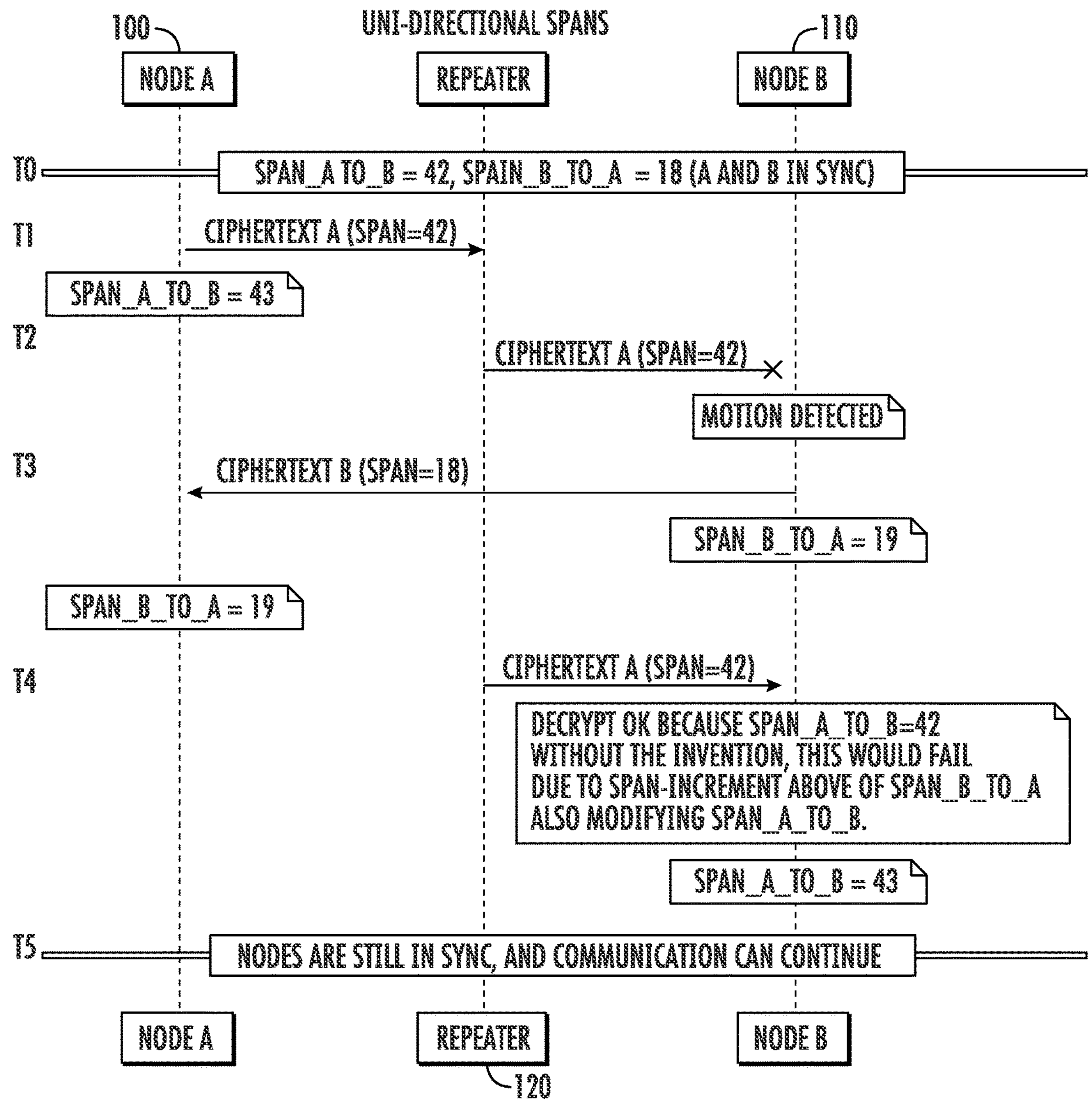
FIG. 3 is a timing diagram showing retention of synchronization according to one embodiment.

FIG. 3 shows the operation of the network device 10 using two separate SPAN values. In this figure, the first node 100, labelled as Node A, is a network device 10 having a configuration similar to that shown in FIG. 2. Similarly, the second node 110, labelled as Node B, is also a network device 10 having a configuration similar to that shown in FIG. 2. Node A and Node B are communicating with each other through an intermediate node 120, which may be a repeater or other device.

Initially, at shown at time T0, the nodes 100, 110 are synchronized. There is a transmit SPAN value for Node A, referred to as SPAN_A_to_B, and a receive SPAN value for Node A, referred to as SPAN_B_to_A. Likewise, there is a transmit SPAN value for Node B, referred to as SPAN_B_to_A, and a receive SPAN value for Node B, referred to as SPAN_A_to_B. The SPAN_A_to_B value for Node A and Node B are synchronized. Similarly, SPAN_B_to_A value for Node A and Node B are synchronized.

The SPAN_B_to_A value and the SPAN_A_to_B value may be initialized using current techniques. For example, for the Z-Wave network protocol, each node contributes to random numbers used to create the initial values. One specific example is given below.

Each node (i.e. Node A and Node B) may contribute an Entropy Input (EI). Each node may contribute 16 bytes. Each EI may be generated using a predetermined algorithm. In one embodiment, a pseudorandom number generator is used to create the EI for each node. These EI values may be communicated to the other node using a special packet format, such as a Resync message.

The EI for each node, which may be referred to as SenderEI and ReceiverEI, are mixed to form a 32 byte entropy value. This 32 byte value may then be used as an input to one or more software functions to generate the Mixed Entropy Input (MEI). In certain embodiments, the one or more software functions may be a CKDF-MEI-Extract and CKDF-MEI-Expand function, as defined by Z-Wave Transport-Encapsulation Command Class Specification, dated Jul. 6, 2020, the disclosure of which is incorporated by reference in its entirety. The MEI may be used as an input to a CTR_DRBG function to generate an inner state set, also referred to as the InnerSPAN. The CTR_DRBG function is defined by NIST Special Publication 800-90A, Revision 1, entitled "Recommendation for Random Number Generation Using Deterministic Random Bit Generators", the disclosure of which is incorporated by reference in its entirety. This procedure establishes the initial nonce value to be used. Subsequent nonce values may be generated using a software function referred to as NextNonce, which may utilize the CTR_DRBG_Generate algorithm defined by the previously mentioned NIST Special Publication. Note that if both nodes utilize the same 32 byte entropy input, the resulting nonce values will be the same for both nodes.

In one embodiment, Node A and Node B each create two 16 byte EI values; one for the SPAN_A_to_B value and one for the SPAN_B_to_A value. In another embodiment, Node A and Node B each create one 16 byte EI value, which are used to seed both the SPAN_A_to_B and SPAN_B_to_A values.

In other embodiments, the initial value may be generated in a different manner. The only requirement is that Node A and Node B utilize the same initial value for the SPAN_A_to_B value and the same initial value for the SPAN_B_to_A value.

The SPAN_A_to_B value is updated by Node A each time it successfully transmits a packet destined for Node B. The SPAN_A_to_B value is updated by Node B each time it successfully receives a packet from Node A. Similarly, the SPAN_B_to_A value is updated by Node A each time it successfully receives a packet from Node B. The SPAN_B_to_A value is updated by Node B each time it successfully transmits a packet destined for Node A. Of course, if there is a third node, such as Node C, Node A may have two additional SPAN values to track packets sent to and received from Node C. Similarly, Node B may also have two additional SPAN values to track packets sent to and received from Node C.

In certain embodiments, the SPAN_A_to_B value and the SPAN_B_to_A value in the figures represent the actual values that are used to encrypt and decrypt the packets. While small numbers are used in this example, it is understood that these numbers may be many bytes in length. Thus, in this embodiment, the values are the actual nonce values. In other embodiments, the values in this disclosure refer to indices into a sequence of nonce values. Thus, if the SPAN_A_to_B value is 18, this refers to the eighteenth entry in the sequence of nonce values.

In another embodiment, a software function, such as the NextNonce function described above, is used to create the nonce values. In this embodiment, the value in the figure represents the number of times that the NextNonce function is invoked. Thus, in all embodiments, the values used in this disclosure are used, either directly or indirectly, to generate the nonce used to encrypt and decrypt a particular packet.

Because the number of packets transmitted from Node A to Node B may be different than the number of packets transmitted from Node B to Node A, the SPAN_A_to_B value and the SPAN_B_to_A value may differ.

Returning to FIG. 3, at time T0, for purposes of illustration, it is assumed that the SPAN_A_to_B value is 42 and the SPAN_B_to_A value is 18. Of course, any other values may also be used.

At time T1, Node A transmits a first packet to the intermediate node 120 and receives an acknowledgement from that intermediate node 120. Consequently, since the packet was successfully transmitted, Node A updates the SPAN_A_to_B value. Thus, Node A now believes that the current SPAN_A_to_B value is 43. As noted above, in certain embodiments, the value shown in the figure is the nonce value. In other embodiments, the value is an index into a sequence of nonce values. In other embodiments, the value represents the number of times that the NextNonce function has been invoked. Thus, the incrementing of the SPAN_A_to_B value signifies that the next SPAN_A_to_B nonce is generated or selected.

At time T2, the intermediate node 120 then forwards the first packet to Node B. However, this transmission may fail, such that Node B does not receive the first packet, which must be retransmitted by the intermediate node 120 at a later time. The retransmission utilizes the same SPAN_A_to_B value.

However, Node B may have a second packet to transmit to Node A. Since this packet is directed from Node B to Node A, the SPAN_B_to_A value is used. Thus, Node B uses the SPAN_B_to_A value of 18 to transmit this second packet to Node A at time T3. Since the second packet was successfully transmitted, Node B increments its SPAN_B_to_A value to 19. As noted above, in certain embodiments, the value is the actual nonce value. In other embodiments, the value is an index into a sequence of nonce values. In other embodiments, the value represents the number of times that the NextNonce function has been invoked. Thus, the incrementing of the SPAN_B_to_A value signifies that the next SPAN_B_to_A nonce is generated or selected.

In certain embodiments, there are two sequences of nonce values; one for the SPAN_A_to_B nonces and one for the SPAN_B_to_A nonces. A SPAN_A_to_B counter and a SPAN_B_to_A counter are used to index into these two sequences, respectively. In other embodiments, there is a single sequence, where the each counter represents the index into that sequence. Thus, the incrementing of a value indicates that the next nonce value is selected for that communication path.

Because there are now separate SPAN values, Node A is able to decrypt this second packet because its SPAN_B_to_A value is also set to 18.

At time T4, the intermediate node 120 successfully forwards the first packet to Node B. Because there are now separate SPAN values, Node B is able to decrypt this packet since this packet utilizes a SPAN_A_to_B value of 42 and the SPAN_A_to_B value for Node B is also set to 42.

Thus, at time T5, Node A and Node B are still synchronized.

In other words, by utilizing unidirectional SPAN values, it is possible to withstand interruptions in transmission and scenarios where a second packet is transmitted from Node B to Node A before the first packet, transmitted by Node A, reached Node B. This may improve overall network performance by reducing the number of times that the two nodes must resynchronize.

Thus, in one embodiment, Node A and Node B each generate a first sequence of nonce values and a first index into the first sequence. The first index in incremented by Node A whenever a packet destined for the Node B is successfully transmitted. The first index is incremented by Node B whenever a packet from Node A is successfully received. The nonce value disposed at the first index into the first sequence is used by the Node A to encrypt packets transmitted to Node B and by the Node B to decrypt packets received from Node A. Additionally, Node A and Node B each generate a second index into a second sequence of nonce values. The second index in incremented by Node B whenever a packet destined for the Node A is successfully transmitted. The second index is incremented by Node A whenever a packet from Node B is successfully received. The nonce value disposed at the second index into the second sequence is used by the Node B to encrypt packets transmitted to Node A and by the Node A to decrypt packets received from Node B. In certain embodiments, the first sequence and the second sequence are the same sequence. In some embodiments, these sequences are generated by invoking a software function, such as the NextNonce function, a plurality of times, wherein each invocation creates a new nonce value. In other embodiments, the sequences may be consecutive numbers.

Thus, in each embodiment, Node A and Node B each create the same initial value for first nonce values used for transmissions from Node A to Node B. Node A updates the first nonce value whenever it transmits a packet successfully toward Node B. Node B updates the first nonce value whenever it successfully receives a packet from Node A. This first nonce value may be referred to as SPAN_A_to_B. As described above, updating the first nonce value may involve: incrementing the nonce value; incrementing the index into a sequence of nonce values; or using a software function to generate a new nonce value.

Node A and Node B also each create the same initial value for second nonce values used for transmissions from Node B to Node A. Node B updates the second nonce value whenever it transmits a packet successfully toward Node A. Node A updates the second nonce value whenever it successfully receives a packet from Node B. This second nonce value may be referred to as SPAN_B_to_A. As described above, updating the second nonce value may involve: incrementing the nonce value; incrementing the index into a sequence of nonce values; or using a software function to generate a new nonce value.

Note that the initial value of the first nonce value and the second value may be the same. However, the first nonce value and the second nonce value differ over time due to a difference in events that cause each nonce value to be updated.

In certain embodiments, where the nodes maintain a sequence of nonce values, the same sequence of nonce values may be used for the first nonce values and the second nonce values. In other embodiments, two sequences of nonce values may be maintained by each node.

In certain embodiments, where the nodes utilize a software function to update the nonce value, the same software function is used for updating the first nonce values and second nonce values.

In certain embodiments, the first nonce value and the second nonce value may be updated by simply incrementing the previous nonce value.

While the above description discloses a system and method to reduce the possibility of a loss of synchronicity, other benefits are also possible.

For example, additional modifications to the typical network protocol can be implemented to reduce the chance of a potential delay attack.

These modifications may be performed in addition to the modification described above, or separately.

Figure 4:
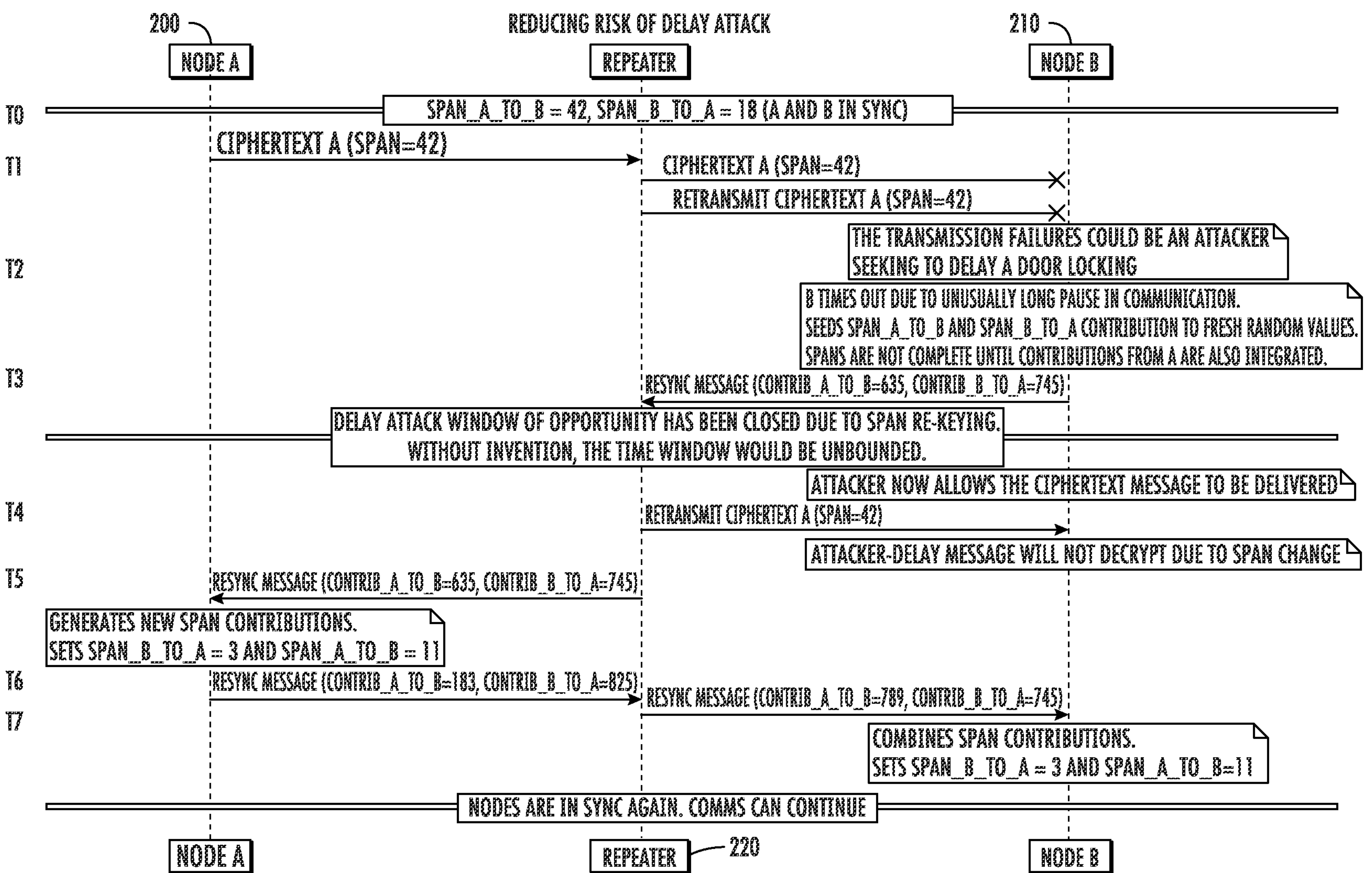
FIG. 4 is a timing diagram showing the response to a delay attack according to one embodiment.

In one embodiment, each node may include a timer. This timer may start after the receipt of an incoming message and may be reset by the receipt of a second message. In other words, the timer may be used to measure the time between two packets. A receiving node may establish a maximum time between received packets. If this maximum time is exceeded, the receiving node may reseed the SPAN value or values. An example of this operation is shown in FIG. 4.

In this embodiment, it is assumed that network device 10 uses two separate SPAN values. In this figure, the first node 200, labelled as Node A, is a network device 10 having a configuration similar to that shown in FIG. 2. Similarly, the second node 210, labelled as Node B, is also a network device 10 having a configuration similar to that shown in FIG. 2. Node A and Node B are communicating with each other through an intermediate node 220, which may be a repeater or other device.

Initially, at shown at time T0, the nodes 200, 210 are synchronized. There is a transmit SPAN value for Node A, referred to as SPAN_A_to_B, and a receive SPAN value for Node A, referred to as SPAN_B_to_A. Likewise, there is a transmit SPAN value for Node B, referred to as SPAN_B_to_A, and a receive SPAN value for Node B, referred to as SPAN_A_to_B. The SPAN_A_to_B value for Node A and Node B are synchronized. Similarly, SPAN_B_to_A value for Node A and Node B are also synchronized.

At time T0, for purposes of illustration, it is assumed that the SPAN_A_to_B value is 42 and the SPAN_B_to_A value is 18. Of course, any other values may also be used.

At time T1, Node A transmits a first packet to Node B via the intermediate node 220. Although not shown, at this time, Node A updates the SPAN_A_to_B value to 43.

At time T2, the intermediate node 220 attempts to forward the first message to Node B. This transmission fails. The intermediate node 220 may attempt to retransmit this first packet one or more additional times. This delay in transmission may be simply noise, or may be an attacker seeking to delay transmission of the first packet. This may be referred to as a delay attack. At some point, the timer within Node B expires, indicating that the time since the last packet received from Node A exceeds a predetermined threshold.

In response, Node B resets the security parameters between itself and Node A. The security parameters include the SPAN_A_to_B value and the SPAN_B_to_A value. Specifically, in this embodiment, Node B may transmit a packet to Node A that serves to resynchronize the communications between the two nodes at time T3. In this packet, which may be referred to as a resynchronization message, or Resync Message, Node B may provide its EI for both the SPAN_A_to_B value and the SPAN_B_to_A value. If two SPANs are used, Node B may transmit two EI values. In another embodiment, Node B may transmit one EI value which is used to seed both the SPAN_A_to_B and the SPAN_B_to_A values. If only one SPAN is used to bidirectional communications, Node B only transmits one EI.

Once Node B determines that the time since the last packet received from Node A exceeds a predetermined threshold, it can no longer decrypt the first message. Thus, at time T4, when the first message is finally successfully transmitted to Node B, Node B will not be able to decrypt the message.

At time T5, the Resync Message from Node B reaches Node A. In response, Node A also resets its security parameters. As stated above, the security parameters include the SPAN_A_to_B value and the SPAN_B_to_A value. Since the Resync Message includes the EI values from the Node B, Node A is able to generate the new SPAN_A_to_B and SPAN_B_to_A values. Node A then transmits a Resync Message to Node B at time T6. This resync message includes the EI values for Node A, which enables Node B to construct the MEI and the new SPAN_A_to_B and SPAN_B_to_A values, as described above. Thus, at time T7, Node A and Node B are again synchronized.

Note that the above scenario describes the case where Node B resets the security parameters based on the duration of time since the last message. In other embodiments, Node B may use other criteria to initiate a resynchronization process. For example, Node B may initiate a resynchronization process at regular intervals, regardless of network traffic. In yet another embodiment, Node B may monitor the noise or RSSI values and may initiate a resynchronization process if these metrics are too large.

Thus, in this embodiment, a node, such as Node B, may initiate a resynchronization process based on a predetermined parameter, such as at regular intervals, based on duration of time between packets or another metric.

Figure 1:
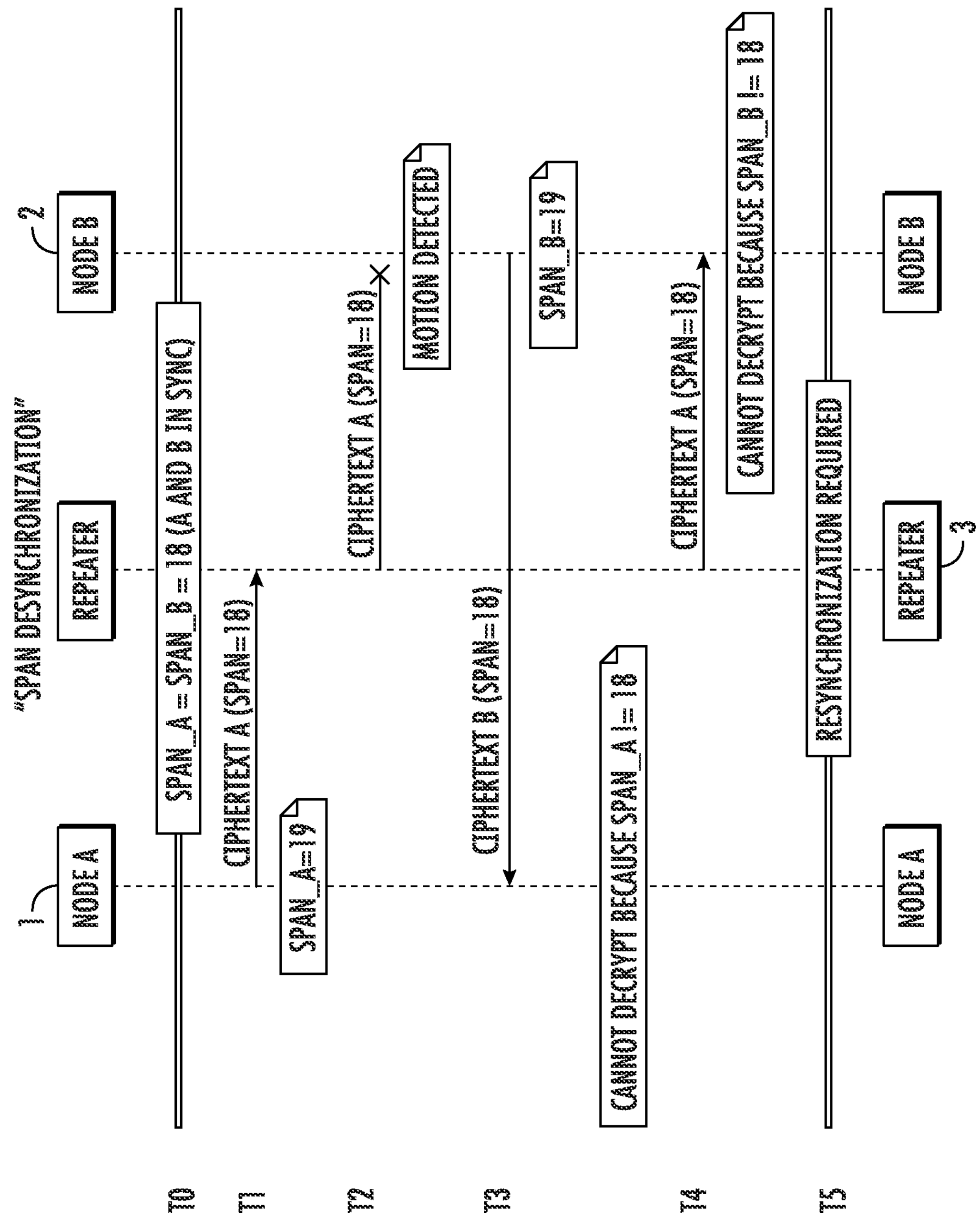
FIG. 1 is a timing diagram showing loss of synchronization according to the prior art.

The present system and method have many advantages. First, as shown in FIG. 1, there are situations where synchronization between two network devices is lost due to timing anomalies. By utilizing two separate unidirectional nonce values, this loss of synchronization may be eliminated. This approach requires minimal additional overhead. A second nonce value is needed for each network device that this network device communicates with. Thus, the synchronization of the devices may be improved with limited impact on system resources.

Second, as shown in FIG. 4, there are situations where a delay attack may take place. By periodically or strategically resetting the security parameters between two nodes, the chance of a delay attack is reduced.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of maintaining synchronization between a first node and a second node transmitting encrypted packets, comprising:
 creating, in the first node and the second node, an initial value for a first nonce value used for transmissions from the first node to the second node;
 updating, at the first node, the first nonce value whenever a packet destined for the second node is successfully transmitted; and
 updating, at the second node, the first nonce value whenever a packet from the first node is successfully received;
 wherein the first nonce value is used by the first node to encrypt packets transmitted to the second node and by the second node to decrypt packets received from the first node.

2. The method of claim 1, further comprising:
 creating, in the first node and the second node, an initial value for a second nonce value used for transmissions from the second node to the first node;
 updating, at the second node, the second nonce value whenever a packet destined for the first node is successfully transmitted; and
 updating, at the first node, the second nonce value whenever a packet from the second node is successfully received;

wherein the second nonce value is used by the second node to encrypt packets transmitted to the first node and by the first node to decrypt packets received from the second node.

3. The method of claim 2, wherein the first nonce value and the second nonce value differ over time due to a difference in events that cause each nonce value to be updated.

4. The method of claim 2, wherein the first node and the second node each comprise a sequence of nonce values, and updating the first nonce value comprises incrementing a first index into the sequence of nonce values and updating the second nonce value comprises incrementing a second index into the sequence of nonce values.

5. The method of claim 2, wherein the first node and the second node each comprise a sequence of first nonce values and a sequence of second nonce values, and updating the first nonce value comprises incrementing a first index into the sequence of first nonce values and updating the second nonce value comprises incrementing a second index into the sequence of second nonce values.

6. The method of claim 1, wherein the first node and the second node each comprise a sequence of first nonce values, and updating the first nonce value comprises incrementing an index into the sequence of first nonce values.

7. The method of claim 1, wherein updating the first nonce value comprises invoking a software function, wherein a new first nonce value is generated each time the software function is invoked.

8. The method of claim 1, wherein updating the first nonce value comprises incrementing a previous first nonce value.

9. A network device, comprising:

a wireless network interface to communicate with a second network device;

a processing unit; and a memory device, comprising instructions, which when executed by the processing unit, enable the network device to:

create an initial value for a first nonce value used for transmissions from the network device to a second network device; and update the first nonce value whenever a packet destined for the second network device is successfully transmitted;

wherein the first nonce value is used to encrypt a packet transmitted to the second network device.

10. The network device of claim 9, further comprising instructions, which when executed by the processing unit, enable the network device to:

create an initial value for a second nonce value used for transmissions from the second network device to the network device; and update the second nonce value whenever a packet from the second network device is successfully received;

wherein the second nonce value is used to decrypt a packet transmitted from second network device.

11. The network device of claim 10, wherein the first nonce value and the second nonce value differ over time due to a difference in events that cause each nonce value to be updated.

12. The network device of claim 10, wherein the network device comprises a sequence of nonce values, and updating the first nonce value comprises incrementing a first index into the sequence of nonce values and updating the second nonce value comprises incrementing a second index into the sequence of nonce values.

13. The network device of claim 10, wherein the network device comprises a sequence of first nonce values and a sequence of second nonce values, and updating the first nonce value comprises incrementing a first index into the sequence of first nonce values and updating the second nonce value comprises incrementing a second index into the sequence of second nonce values.

14. The network device of claim 9, wherein the network device comprises a sequence of first nonce values, and updating the first nonce value comprises incrementing an index into the sequence of first nonce values.

15. The network device of claim 9, wherein updating the first nonce value comprises invoking a software function, wherein a new first nonce value is generated each time the software function is invoked.

* * * * *